Dec. 13, 1927.                                                    1,652,976
F. DE BENEDETTI
CONNECTING MEMBER
Filed Oct. 9, 1925

Francesco de Benedetti
Inventor

Patented Dec. 13, 1927.

1,652,976

UNITED STATES PATENT OFFICE.

FRANCESCO DE BENEDETTI, OF TURIN, ITALY.

CONNECTING MEMBER.

Application filed October 9, 1925, Serial No. 61,565, and in Italy October 25, 1924.

The present invention has for its object a connecting member for pivotal connection of levers or cranks and rods or the like, and said member comprises pieces of aluminium or aluminium alloy which provide bearings for a pivot of the lever or crank and a stiffening member embedded in said pieces to which is connected the said rod or similar part to be pivotally connected with said lever or crank.

On the annexed drawing is shown by way of example an embodiment of the present invention, and Figure 1 is a side view of the connecting member;

Figure 1:
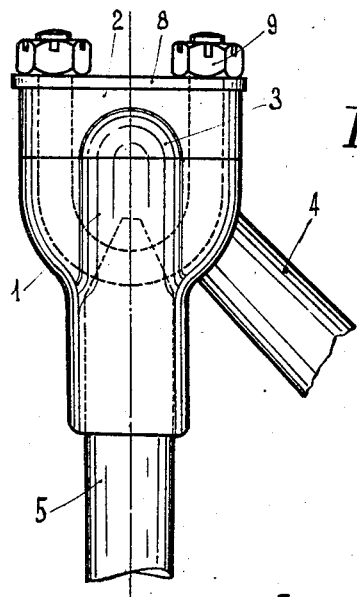
Figure 3:
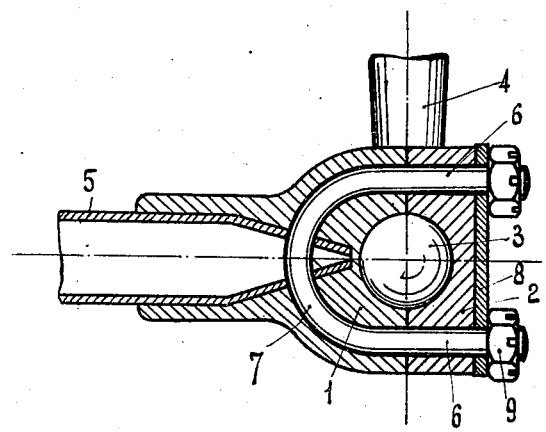
Figure 3 is an end view.
Figure 2:
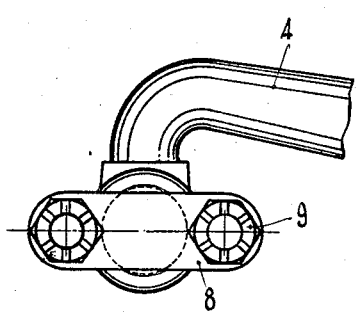
Figure 2 is a transverse section.

In the embodiment illustrated on the drawing the member is intended to pivotally connect a crank 4 having a ball end 3 with a rod 5.

The connecting member comprises two blocks 1 and 2 having contacting surfaces and providing in their contact surfaces a ball seat for said ball end 3, while the rod 5 is connected with block 1 in the manner hereinafter described.

Said blocks 1 and 2 are made of aluminium or of aluminium alloy and thus they may be easily manufactured by the known methods of casting in their final shape, without machining, while they have large resistance against wearing by friction.

The end of the rod 5 is embedded in the block 1 at the time of casting this latter, and said rod has at its end a perforation in which passes a strap 7 whose legs project outwardly from the bearing surface of the block 1 and receive nuts 9 which secure removably in position the block 2 on the block 1, a hard metal plate 8 being arranged between the surface of block 2 and nuts 9.

At the time of casting the block 1, the strap 7 and rod 5 are interlinked with each other and are arranged in the casting mold, and then the metal intended to provide said block 1 is poured in the mold, said metal producing the block 1 and firmly fastening together the parts 5 and 7.

The block 2 is of course cast separately.

At the time of mounting the parts, the ball head 3 is engaged in the ball-seat of block 1 and the block 2 is put in position on the extending legs of the strap 7, with the said hard metal plate 8 above it, and nuts 9 are finally screwed down.

In the connecting member according to the present invention the parts subjected to tensile stress that is the strap 7 and rod 5, are made of high resistance metal and are directly interconnected with each other, while the pivot bearing parts 1—2 are merely subject to compression stresses, one of them acting further to hold in required respective position said strap and rod.

What I claim as my invention and desire to secure by U. S. Letters Patent is:—

1. A connecting member comprising a rod having a transverse perforation at its end, a U-shaped strap having its intermediate portion engaged in said perforation, a metal part cast on said rod end and strap to interengage them, said part providing a bearing block having a pivot seat, a second bearing block having a pivot seat and perforations for receiving the legs of said strap, nuts screwed on the ends of said strap to force said blocks together and a metal plate between said nuts and the second named block.

2. A connecting member comprising a rod, a strap engaging said rod and having portions extending beyond an end of said rod, a bearing block cast about said rod and said strap in the region of engagement, a second bearing block adapted for assembly with the first bearing block to provide a pivot seat, and means on said extended portions of said strap for maintaining said blocks assembled.

3. A connecting member comprising a rod pierced transversely at an end thereof, a strap passing through said rod, engaging said rod and having portions extending beyond the end of said rod, a bearing block cast about said rod and said strap in the region of engagement, a second bearing block adapted for assembly with the first bearing block to provide a pivot seat and means on said extended portions of said strap for maintaining said blocks assembled.

4. A connecting member comprising a rod, a U-shaped strap having its intermediate portion engaged with one end of said rod, a metal part cast on said rod end and strap to interengage them, said part providing a bearing block having a pivot seat, a second bearing block having a pivot seat and perforations for receiving the legs of said strap, and means on the ends of said strap to force said blocks together with their pivot seats in register with each other.

In testimony whereof I have signed my name to this specification.

FRANCESCO DE BENEDETTI.